United States Patent Office 3,702,850
Patented Nov. 14, 1972

3,702,850
1,2,3,6-TETRAHYDROPYRIDINE DERIVATIVES
Andrea Pedrazzoli and Leone Dall Asta, Milan, Italy, assignors to Societe d'Etudes de Recherches et d'Applications Scientifiques et Medicales E.R.A.S.M.E., Paris, France
No Drawing. Original application Aug. 21, 1967, Ser. No. 661,794. Divided and this application Nov. 20, 1970, Ser. No. 91,523
Claims priority, application Great Britain, Aug. 23, 1966, 37,833/66; Nov. 21, 1966, 52,071/66
Int. Cl. C07d 31/50
U.S. Cl. 260—294.8 G                            6 Claims

ABSTRACT OF THE DISCLOSURE

The present invention relates to novel derivatives of propane-2,3-diol and 3-mercapto-propane-2-ol, which are therapeutically useful, and their process of preparation.

The compounds of the invention have the following general formula:

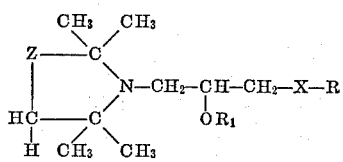

wherein:

Z is the group —CH=CH—
R is alkyl of 1 to 4 carbon atoms; phenyl, phenyl substituted at least by one of lower alkyl, chloro, methoxy or benzyloxy; naphthyl; benzyl; phenethyl; diphenylmethyl; pyridyl;
X is O or S; and
$R_1$ is hydrogen atom or —$COR_2$ in which $R_2$ is phenyl substituted by at least one of a chlorine-atom or methoxy; phenoxymethyl, chlorophenoxymethyl; styryl or pyridyl.

---

This is a divisional application of patent application Ser. No. 661,794, filed on Aug. 21, 1967, and now abandoned.

The products of the invention can be prepared according to a reaction shown by the following scheme:

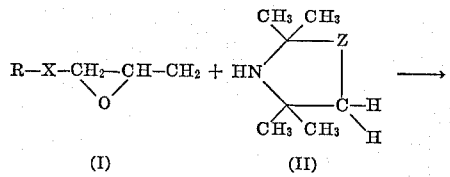

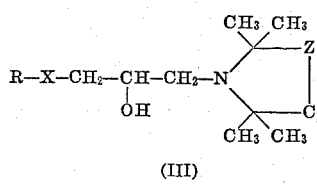

the product so obtained is reacted with an acid halide $R_2COY$ (Y being a halogen) to give:

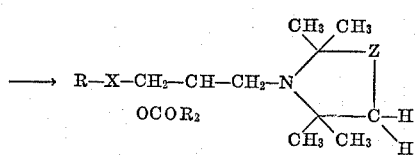

Z, X and $R_2$ having the meanings given above.

The compounds such as III can also be synthesised by means of the following chemical reaction:

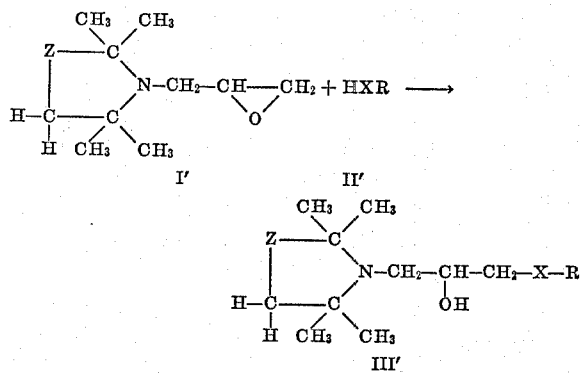

The present invention relates to novel derivatives of propane-2,3-diol and 3-mercapto-propan-2-ol, which are therapeutically useful, their pharmaceutically acceptable acid addition salts, and their process of preparation.

The compounds of the invention have the following general formula:

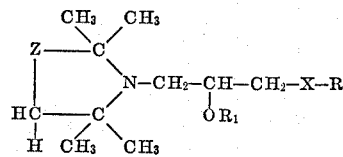

wherein:

Z is the group —CH=CH—
R is a straight or branched saturated aliphatic radical having 1 to 4 carbon atoms, a substituted or unsubstituted arylaliphatic radical, phenyl radical or naphthyl radical or a hexatomic heterocyclic ring containing one or two heteroatoms at least one of which is a nitrogen atom:
X is O or S;
$R_1$ is a hydrogen atom or a $COR_2$ radical which is either a saturated or unsaturated aliphatic acid residue with a straight or branched chain of 1 to 9 carbon atoms or a saturated or unsaturated aryl-aliphatic acid residue with a straight or branched chain of 1 to 4 carbon atoms or a substituted or unsubstituted aromatic acid residue or a hexatomic heterocyclic acid residue containing 1 or 2 heteroatoms, one of which is N, or a phenoxyacetic or phenylthioacetic acid residue which is substituted or unsubstituted in the ring.

The products of the invention can be prepared according to a reaction shown by the following scheme:

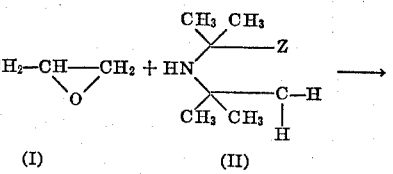

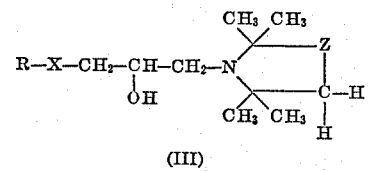

the product so obtained is reacted with an acid halide R₂COY (Y being a halogen) to give:

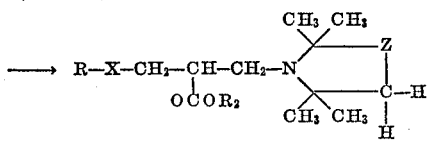

Z, X and R₂ having the meanings given above. The reaction between the compounds I and II occurs by heating the two, preferably in a polar solvent, in the presence of a small quantity of a mineral acid, such as hydrochloric acid, sulphuric acid or phosphoric acid. The reaction can also take place in the absence of a catalyst, in a solvent containing OH groups such as an aliphatic alcohol or an arylaliphatic alcohol.

The compounds such as III can also be synthesised by means of the following chemical reaction:

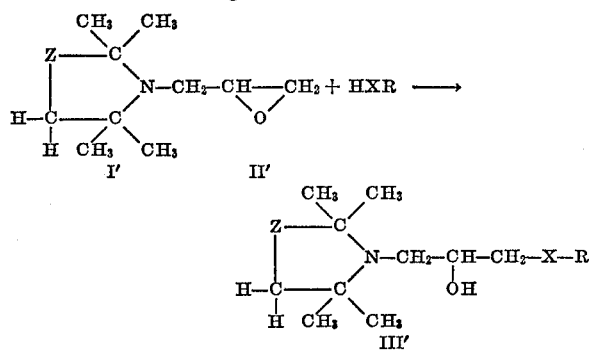

The compound I' used for this reaction can be obtained by reacting at boiling point compounds of the formula:

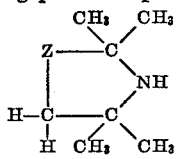

with epichlorhydrin, in an inert solvent such as toluene or xylene, for periods of 12–72 hours, and then treating the cooled mass with pulverised anhydrous alkaline hydrates; the reaction product is then distilled.

When obtained by one or other of the reactions, to the point (III), it is isolated by distillation. It can be salified with an inorganic or organic acid to obtain pharmaceutically acceptable acid addition salts; it can also be esterified by reaction in an inert organic solvent, such as benzene, toluene, xylene, tetrahydrofuran or dimethylformamide, with an acid halide R₂COY (preferably an acid chloride R₂COCl) in the presence of a basic hydrogen acceptor, such as a tertiary amine for example. This esterification reaction takes place at room temperature but, to complete it, it is preferable to heat the mixture under reflux for several hours.

The products of the invention are stable to light and to heat and have a remarkable pharmacological activity, in particular as local anaesthetic agents.

The following examples illustrate the invention without limiting it.

EXAMPLE 1

1-(1',2',3',6'-tetrahydro-2',2',6',6'-tetramethyl-pyridyl-1')-3-(o-toloxy)-propane-2-ol hydrochloride A solution of 41 g. of 1-(o-toloxy)-2,3-epoxy-propane and 35.5 g. of 1,2,3,6-tetrahydro-2,2,6,6-tetramethylpyridine was heated in 80 ml. of n-butanol to 135° for 18 hours, and first the solvent was distilled off under vacuum and then the product.

43 g. of yellow oil, B.P.=196°–200° C. at 1.4 mm. Hg was obtained. The oil was dissolved in anhydrous ethyl ether and was treated with an ethereal solution of hydrochloric acid until 42 g. of hydrochloride having M.P.= 182°–184° C. were obtained.

The product, when crystallised from isopropanol, melted at 185°–188.5° C.

EXAMPLE 2

1-(1',2',3',6'-tetrahydro-2',2',6',6'-tetramethyl-pyridyl-1')-3-(β-phenethyloxy)-propane-2-ol hydrochloride A solution of 35.6 g. of 1-(β-phenethyloxy-2,3-epoxy-propane and 30.5 of 1,2,3,6-tetrahydro-2,2,6,6-tetramethyl-pyridine in 80 ml. of n-butanol was heated to 135° C. for 18 hours, and first the solvent was distilled off under vacuum and then the product; 46 g. of oil having a B.P.=196°–200° C. at 0.15 mm. Hg was obtained. The oil was dissolved in anhydrous ethyl ether and was treated with an ethereal solution of hydrochloric acid until 46 g. of hydrochloride having M.P.=146°–149° C. were obtained.

The product, when crystallised from isopropanol, melted at 148.5°–149.5° C.

EXAMPLE 3

1-(1',2',3',6'-tetrahydro-2',2',6',6'-tetramethyl-pyridyl-1')-3-(p-chlorophenyl-thio)-propane-2-ol hydrochloride A solution of 41 g. of 1-(1',2',3',6'-tetrahydro-2',2', 6',6'-tetramethyl-pyridyl-1')-2,3-epoxy-propane and 29 g. of p-chloro-thiophenol in 50 ml. of n-amyl alcohol was heated for 24 hours; after distilling off the solvent under vacuum, the oil obtained was dissolved in isopropanol and was acidified with gaseous HCl. After cooling, the product was filtered and crystallised from methanol to obtain 59 g. of product having M.P.=233°–235° C.

EXAMPLE 4

1-(1',2',3',6'-tetrahydro-2',2',6',6'-tetramethyl-pyridyl-1')-3-(pyridyl-4''-thio)-propane-2-ol hydrochloride A solution of 41 g. of 1-(1',2',3',6' - tetrahydro-2',2',6',6' - tetramethyl - pyridyl - 1') - 2,3-epoxy-propane and 22.2 g of 4-mercaptopyridine in 100 ml. of n-butanol was heated for 24 hours; after distilling off the solvent under vacuum, the oil obtained was dissolved in isopropanol and was acidified with gaseous HCl.

After cooling, the product was filtered and crystallised from isopropanol to obtain 36 g. of product having M.P.=216°–218° C.

Examples of compounds of the invention are cited in the following table.

TABLE I

GENERAL FORMULA:

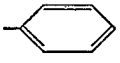

| Compound of Example No. | R | R¹ | X | Z | Formula of product obtained | Melting point |
|---|---|---|---|---|---|---|
| 5 | 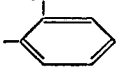 | H | O | —CH=CH— | $C_{18}H_{27}NO_2 \cdot HCl$ | 191–193° |
| 6 | H₃C—⟨⟩ | H | O | —CH=CH— | $C_{19}H_{29}NO_2 \cdot HCl$ | 186–188° |

TABLE I—Continued

| Compound of Example No. | R | R¹ | X | Z | Formula of product obtained | Melting point |
|---|---|---|---|---|---|---|
| 7 | 2,4-dimethylphenyl (H₃C, H₃C on phenyl) | H | O | —CH=CH— | $C_{20}H_{31}NO_2 \cdot HCl$ | 218–220° |
| 8 | 2-chlorophenyl | H | O | —CH=CH— | $C_{18}H_{26}ClNO_2 \cdot HCl$ | 192–194° |
| 9 | 3-chlorophenyl | H | O | —CH=CH— | $C_{18}H_{26}ClNO_2 \cdot HCl$ | 208–210.5° |
| 10 | 4-chlorophenyl | H | O | —CH=CH— | $C_{18}H_{26}ClNO_2 \cdot HCl$ | 205–208° |
| 11 | 2-methoxyphenyl (H₃CO) | H | O | —CH=CH— | $C_{19}H_{29}NO_3 \cdot HCl$ | 188–190° |
| 12 | 2-methyl-4,5-dichlorophenyl | H | O | —CH=CH— | $C_{19}H_{27}Cl_2NO_2 \cdot HCl$ | 206–207.5° |
| 13 | —CH₂—phenyl | H | O | —CH=CH— | $C_{19}H_{29}NO_2$ | 175–178° (0.15) |
| 14 | —CH₂—CH₂—phenyl | H | O | —CH=CH— | $C_{20}H_{31}NO_2 \cdot HCl$ | 148.5–149.5° |
| 15 | —CH(phenyl)₂ | H | O | —CH=CH— | $C_{25}H_{33}NO_2 \cdot HCl$ | 177.5–179° |
| 16 | 4-chlorophenyl | H | S | —CH=CH— | $C_{18}H_{26}ClNOS \cdot HCl$ | 233–235° |
| 17 | —CH₂—phenyl | H | S | —CH=CH— | $C_{19}H_{29}NOS$ | 200–203° (1) |
| 18 | pyridyl | H | S | —CH=CH— | $C_{17}H_{28}N_2OS \cdot 2HCl$ | 216–218° |

The compounds of the invention have an excellent local anaesthetic activity by conduction, surface and infiltration.

This action has been evaluated according to the following tests:

(a) conduction anaesthesia in rats
 (Setnikar, I., Arzneimittel-Forschung, 16, 1025, 1966)
(b) conduction anaesthesia in mice
 (Bianchi, C., Br. J. Pharmacol., 11, 104, 1956)
(c) surface anaesthesia in rabbit eyes
 (Regnier, T., Bull. Sci. Pharmacol., 30, 580 and 646, 1923).
(d) infiltration anaesthesia in guineapigs
 (Bülbring, E., Wajde, I., J. Pharmacol., 85, 78, 1945).

Some compounds of the invention also have general anaesthetic, myolitic and anticonvulsant activity.

The compounds of the invention generally have an acute toxicity lower than or analogous to that of local anaesthetics commonly used (lidocaine, novocaine).

Even the effects on pressure and respiration in cats anaesthetised with Nembutal are not different from those caused by the same doses of lidocaine.

The most active and best tolerated compounds of the invention can be used as local anaesthetics in general surgery, gynaecology, otorinolaryngoiatry, odonto-stomatology, dermatology and so on. Compound of Example 6, given in Table I, is the most active as a local anaesthetic agent.

What is claimed is:
1. A compound of the formula

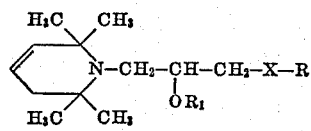

wherein:

R is alkyl of 1 to 4 carbon atoms; phenyl; phenyl substituted by lower alkyl, chloro, methoxy or benzyloxy; naphthyl, benzyl, phenethyl, diphenylmethyl, or pyridyl;

X is O or S; and

R₁ is hydrogen, and its pharmaceutically acceptable acid addition salts.

2. 1-(1',2',3',6' - tetrahydro - 2',2',4',4' - tetramethylpyridyl-1')-3-(o-toloxy)-propane-2-ol hydrochloride.

3. 1-(1',2',3',6' - tetrahydro - 2',2',6',6' - tetramethylpyridyl-1')-3-(o-toloxy)-propane-2-ol hydrochloride.

4. 1-(1',2',3',6' - tetrahydro - 2',2',6',6' - tetramethyl-pyridyl-1')-3-($\beta$ - phenethyloxy) - propane - 2-ol hydrochloride.

5. 1-(1',2',3',6' - tetrahydro - 2',2',6',6' - tetramethyl-pyridyl - 1') - 3 - (p - chlorophenyl - thio) - propane-2-ol hydrochloride.

6. 1-(1',2',3',6' - tetrahydro - 2',2',6',6' - tetramethyl-pyridyl - 1') - 3 - (pyridyl - 4" - thio) - propane - 2 - ol hydrochloride.

References Cited

UNITED STATES PATENTS 3,498,994  3/1970  Kuhnis et al. _____ 260—297 R

ALAN L. ROTMAN, Primary Examiner

U.S. Cl. X.R.

260—295 R, 297 R; 424—263, 266